United States Patent
Shamshoum et al.

(10) Patent No.: US 6,201,081 B1
(45) Date of Patent: Mar. 13, 2001

(54) CATALYST EFFICIENCY FOR SUPPORTED METALLOCENE CATALYST

(75) Inventors: Edwar S. Shamshoum, Houston; Margarito Lopez, Pasadena; B. Raghava Reddy, Baytown; Theodore G. Harris, Seabrook, all of TX (US)

(73) Assignee: Fine Technology, Inc., Houston, TX (US)

( * ) Notice: Subject to any disclaimer, the term of this patent is extended or adjusted under 35 U.S.C. 154(b) by 0 days.

(21) Appl. No.: 09/305,135

(22) Filed: May 4, 1999

Related U.S. Application Data

(62) Division of application No. 08/772,667, filed on Dec. 20, 1996, now Pat. No. 5,968,864.

(51) Int. Cl.$^7$ ..................................................... C08F 4/42
(52) U.S. Cl. ..................... 526/160; 526/127; 526/348; 526/943; 502/104; 502/117; 502/152
(58) Field of Search ................................ 526/127, 160, 526/943, 348; 502/104, 117, 152

(56) References Cited

U.S. PATENT DOCUMENTS

| | | | |
|---|---|---|---|
| 4,808,561 | * | 2/1989 | Welborn, Jr. ............... 502/104 |
| 4,892,851 | * | 1/1990 | Ewen et al. ............... 502/104 |
| 4,925,821 | * | 5/1990 | Chang ...................... 502/107 |
| 5,145,819 | * | 9/1992 | Winter et al. ............. 502/117 |
| 5,468,702 | * | 11/1995 | Jejelowo .................. 502/104 |
| 5,623,022 | * | 4/1997 | Sugano et al. ............ 525/247 |
| 5,719,095 | * | 2/1998 | Brekner et al. ........... 502/104 |

FOREIGN PATENT DOCUMENTS 0 576 970 * 1/1994 (EP) .

* cited by examiner

*Primary Examiner*—David W. Wu
*Assistant Examiner*—Ling-Siu Choi
(74) *Attorney, Agent, or Firm*—Jim D. Wheelington

(57) ABSTRACT

The invention provides a polymerization process with improved catalyst activity of a metallocene catalyst supported on silica treated with MAO, a process for supporting a metallocene compound on silica treated with MAO, a metallocene catalyst supported on silica treated with MAO within a certain temperature range and a process for making a metallocene catalyst supported on silica treated with MAO. The invention includes supporting the metallocene compound on a MAO-treated silica at a temperature of below 0° C. The supported catalyst is activated with an aluminum alkyl. The catalyst may be prepolymerized in a tubular reactor prior to being introduced into the polymerization reaction zone.

28 Claims, 2 Drawing Sheets

CATALYST EFFICIENCY FOR SUPPORTED METALLOCENE CATALYST

This is a divisional application of application Ser. No. 08/772,667 filed Dec. 20, 1996, now U.S. Pat. No. 5,968,864.

BACKGROUND OF THE INVENTION

1. Field of the Invention

This invention relates to method of making a catalyst component. A metallocene compound is supported on a silica material treated with an alumoxane co-catalyst and complexed with the alumoxane. The supported metallocene catalyst may be used in the polymerization of olefins, such as propylene. The temperature of the process for supporting the metallocene on the silica affects catalyst efficiency.

2. Description of the Prior Art

Metallocene catalysts for the polymerization of olefins are known in the art and have been known at least since U.S. Pat. No. 4,542,199, which described use of a catalyst to produce polyethylene. Since that time, patents have issued relating to isospecific and syndiospecific metallocene catalysts. Examples of these patents include U.S. Pat. Nos. 4,794,096 and 4,892,851, respectively, the disclosures of which, together with the disclosure of U.S. Pat. No. 4,542,199, are hereby incorporated by reference.

These patents disclose metallocene catalysts that are basically a complex derived from a cyclopentadiene, i.e., a metal derivative of cyclopentadiene, which has been ionized by an ionizing agent to form an active cationic metallocene catalyst. It has also become known in the art that metallocenes may be supported on an inert non-reactive material.

In U.S. Pat. No. 5,106,804 a zirconocene is supported on magnesium dichloride. The contact between the metallocene, the solid support and an organoaluminum compound at a temperature from 0° C. to the boiling temperature of the hydrocarbon solvent employed in the solutions and is preferably from 0° C. to 110° C. This patent states that in a two step process of contacting the solid support with the organoaluminum and then contacting the solid support with the metallocene, the temperature of the first step may be different than that of latter.

In U.S. Pat. No. 5,126,301 a fine particle carrier was treated with a metallocene and an aluminoxane, either consecutively or simultaneously. The preferred process was to treat the carrier first with the metallocene, then the aluminoxane. The temperature at which treatment with a solution of the metallocene occurred was −50° C. to 110° C., and preferably from 0° C. to 80° C.

In U.S. Pat. No. 5,183,867 a metallocene, an alumoxane and a nonmetallocene containing transition metal compound are reacted on a support at a temperature from 0° C. to 100° C. In the working examples the catalysts were made at 25° C. and 80° C.

In U.S. Pat. No. 5,281,679 an alumoxane is deposited on a hydrated silica gel by a reaction between the water and an aluminum trialkyl. A metallocene is then complexed with the alumoxane is a slurry at ambient temperature or at an elevated temperature of about 75° C.

In U.S. Pat. No. 5,296,565 a particulate carrier, an organoaluminum oxy compound, a metallocene and, optionally, an organoaluminum compound are mixed and contacted to form a supported carrier. The temperature at which the mix/contact takes place is −100 to 200° C., preferably −70 to 100° C. A range of −30 to 200° C. is given for mixing and contacting the carrier and the organoaluminum oxy compound is given but no range is given for mixing the metallocene. In the working examples mixing and contacting the metallocene occurred at 30° C. and room temperature.

In U.S. Pat. No. 5,397,757 a metallocene complex, carbon tetrachloride or carbon tetrabromide, an organomagnesium compound and trimethylaluminum were combined to avoid use of aluminoxane to activate the catalyst. The metallocene was supported on silica by slurrying at 20–60° C., preferably 30–55° C.

In U.S. Pat. No. 5,529,965 a catalyst having a metallocene component and a non-metallocene component on silica containing water and an organometallic compound, such as trimethyl aluminum, was used to polymerize ethylene. In the working examples the catalytic components were supported on the silica at 165° F. (74° C.).

SUMMARY OF THE INVENTION

The invention provides a process for making a metallocene catalyst useful in the polymerization of olefins, particularly propylene. One embodiment of the present invention includes forming a supported metallocene catalyst on an inert, non-reactive support, such as silica which has been treated with an alumoxane. The supported metallocene catalyst can be suspended in an inert liquid carrier, such as mineral oil, contacted with a trialkylaluminum co-catalyst, such as tri-isobutyl aluminum or triethyl aluminum, and introduced into a polymerization reaction zone which contains a monomer.

The catalyst can be pre-polymerized with the co-catalyst and an olefin monomer. The olefin is added after the catalyst has contacted the co-catalyst. The catalyst is contacted with the co-catalyst, for a certain period of time. The catalyst and co-catalyst can be suspended in an inert liquid carrier, such as mineral oil. The prepolymerized catalyst is then introduced into the reaction zone. It is preferred to have a stream of olefin contact the catalyst and co-catalyst and carry the catalyst into the reaction zone.

In the pre-polymerization step, the catalyst may be coated with a polymer product such that the weight ratio of polymer/catalyst is approximately 0.01–3.0. Preferably, the ratio of coating the catalyst is greater than 1.0 and, more preferably, 2.0–3.0. The preferred olefin is propylene.

The preferred catalyst is a metallocene catalyst of the general formula:

$$R''_b(CpR_{5-b})CpR'_{5-b})MR^*_{v-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M. The preferred co-catalyst for all supported metallocene catalysts is an alkylaluminum compound, and most preferably tri-isobutyl aluminum.

Improved catalytic activity is realized for isospecific, syndiospecific and aspecific metallocene catalysts as the temperature of the process for supporting the metallocene on the MAO-treated silica decreases, i.e., the lower temperature of the supporting process, the higher the catalyst activity.

BRIEF DESCRIPTION OF THE DRAWINGS

A more complete appreciation of the invention and many of the attendant advantages thereof will be readily understood by reference to the following detailed description when considered in connection with the accompanying drawing wherein.

DETAILED DESCRIPTION OF THE INVENTION

Figure 1:
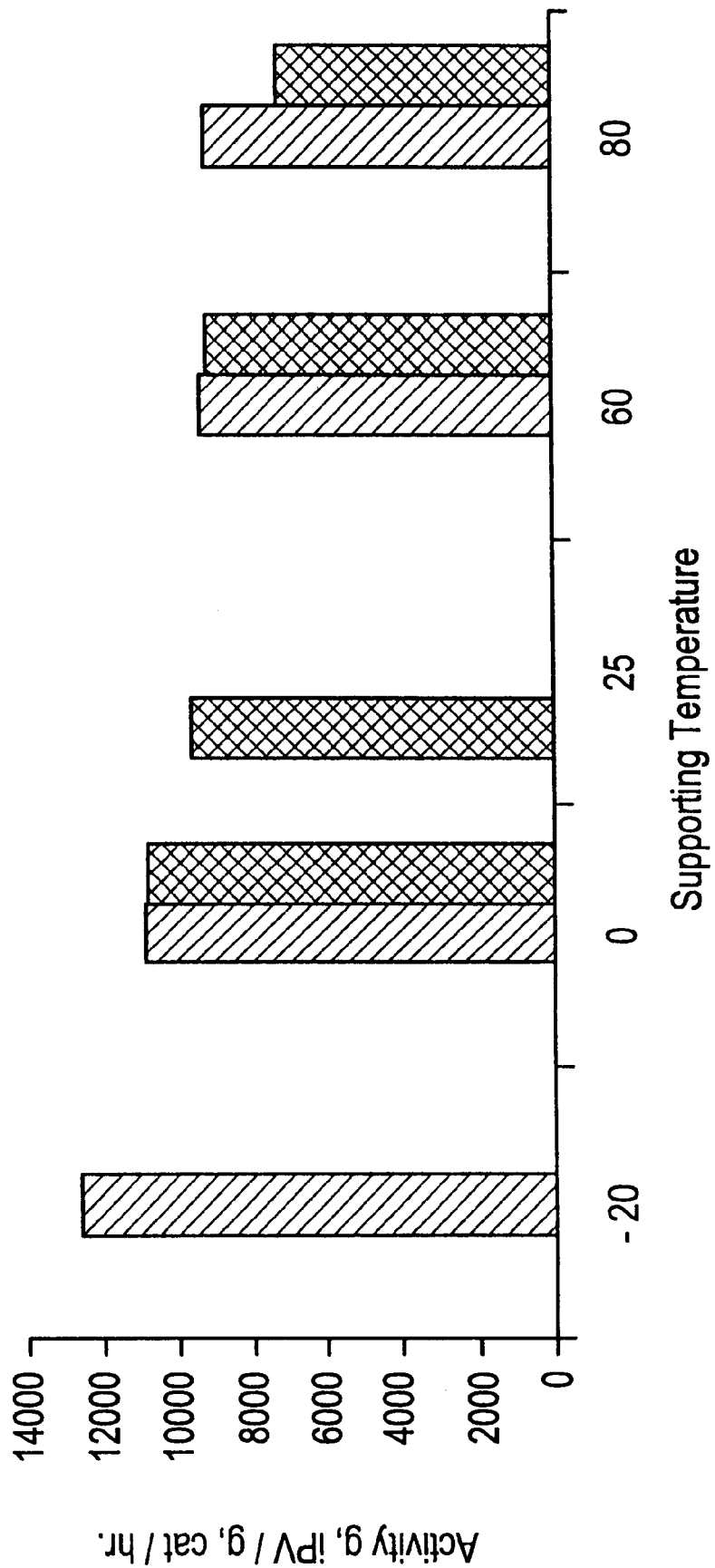
FIG. 1 is a graphic representation of the effect on catalyst activity of temperature during the process of supporting a metallocene compound on MAO-treated silica to form an isospecific catalyst (Examples 5–12).
Figure 2:
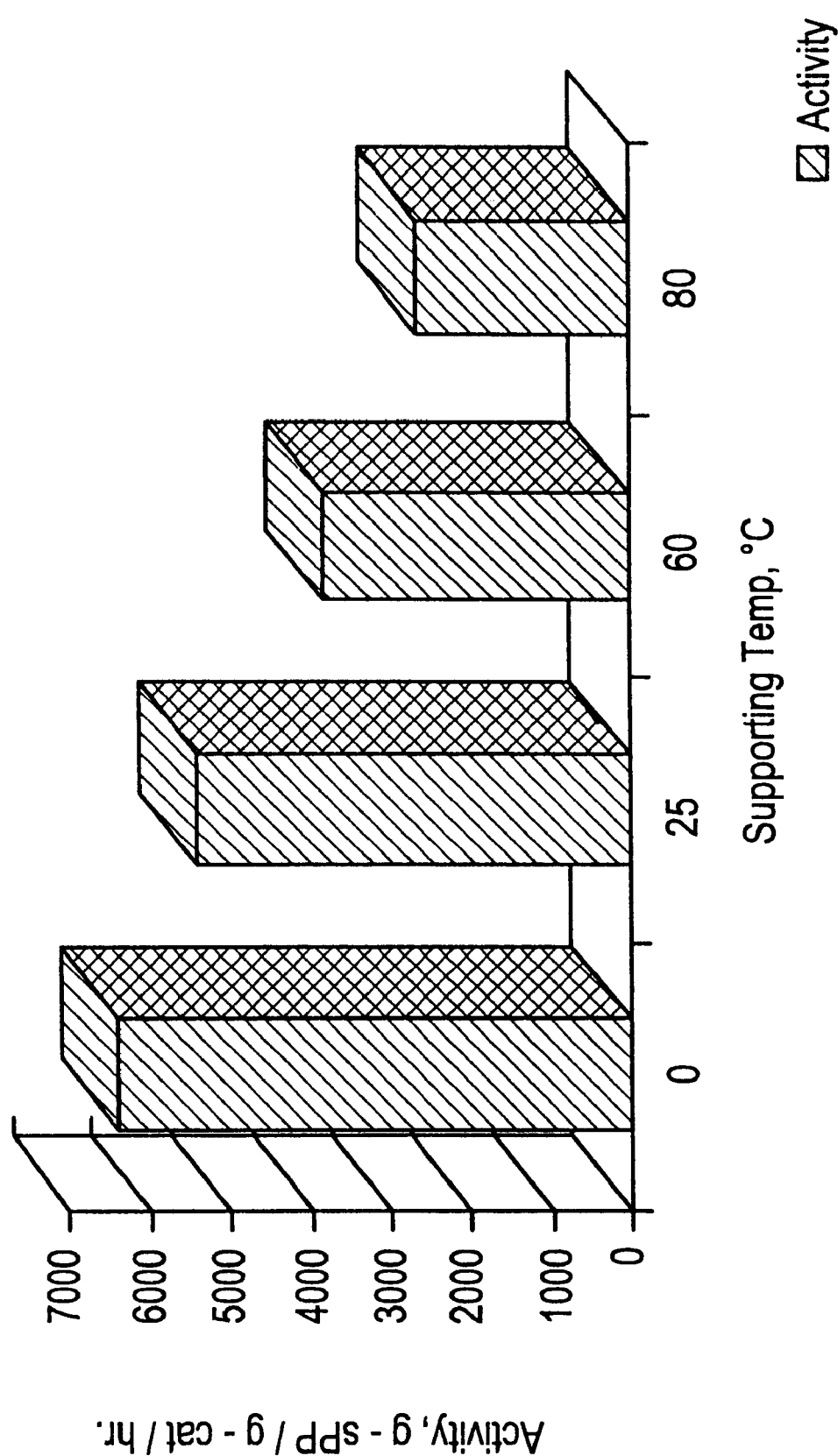
FIG. 2 is a graphic representation of the effect on catalyst activity of temperature during the process of supporting a metallocene compound on MAO-treated silica to form a syndiospecific catalyst (Examples 1–4).

The present invention provides a process for synthesis of a metallocene catalyst useful in the polymerization of α-olefins. The invention is particularly adapted for the polymerization of propylene. The invention includes contacting the supported metallocene catalyst with an aluminum alkyl co-catalyst. Prepolymerizing the catalyst prior to introducing it into a polymerization reaction zone is preferred. One embodiment of the invention includes contacting the supported metallocene catalyst with the aluminum alkyl co-catalyst for a certain period of time which may vary depending on whether the catalyst is isospecific or syndiospecific.

Metallocene catalysts can be generally defined as a metal derivative of cyclopentadiene, which has been ionized to form an active cationic metallocene catalyst. The metallocene compound generally contains two cyclopentadienyl rings, substituted or unsubstituted, and is of the general formula:

$$R''_b(CpR_{5-b})(CpR'_{5-b})MR^*_{v-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different and $(CpR_{5-b})$ and $(CpR'_{5-b})$ being the same or different, M is a Group IIIB, IVB, VB or VIB metal, preferably a Group IVB metal, more preferably titanium, zirconium or hafnium, and most preferably zirconium; R* is a hydride, a halogen or a hydrocarbyl from 1–20 carbon atoms, v is the valence of M.

R" is a bivalent radical which bond or coordinates with $(CpR_{5-b})$ and $(CpR'_{5-b})$. R" is preferably a substituted or unsubstituted alkyl radical having 1–4 carbon atoms as the bridging component and substituents of hydrocarbyl radicals having 1–10 carbon atoms or a radical containing silicon, germanium, phosphorus, nitrogen, boron or aluminum atoms as the bridging component and substituents of hydrocarbyl radicals having 1–10 carbon atoms. More preferably, R" is preferably a hydrocarbyl or hydrosilyl radical having one atom of carbon or silicon to form the bridge. R" may be a methylidene, ethylidene, isopropylidene, diphenylmethylidene or dimethylsilylidene radical and, most preferably, is an isopropylidene or dimethylsilylidene radical.

For an isospecific catalyst, each $(CpR_{5-b})$ and $(CpR'_{5-b})$ are preferably the same and, more preferably, are a cyclopentadienyl or indenyl ring, substituted or unsubstituted. Examples of these isospecific catalysts are dimethylsilylbis (2-methylindenyl) zirconium dichloride and dimethylsilylbis(2-methyl-4-phenyl indenyl)zirconium dichloride. In the alternative, for an isospecific catalyst $(CpR'_{5-b})$ is a sterically different substituted cyclopentadienyl ring than $(CpR'_{5-b})$ in which one cyclopentadienyl ring is an unsubstituted fluorenyl and one and only one of the distal positions of the other cyclopentadienyl rings has a bulky group as a substituent having a spatial displacement greater than a methyl ($CH_3$) group and, more preferably, having a spatial displacement equal to or greater than a t-butyl group ($CH_3CH_3CH_3C$) group as disclosed in U.S. Pat. No. 5,416,228, issued May 16, 1995, hereby incorporated by reference. An example of this isospecific catalyst is isopropylidene(t-butylcyclopentadienyl-1-fluorenyl) zirconium dichloride.

For a syndiospecific catalyst, each $(CpR_{5-b})$ and $(CpR'_{5-b})$ are different and bilateral symmetry exists at least for $(CpR_{5-b})$ and preferably for both $(CpR_{5-b})$ and $(CpR'_{5-b})$. Preferably, $(CpR_{5-b})$ is an unsubstituted cyclopentadienyl or cyclopentadienyl substituted in proximal positions and $(CpR'_{5-b})$ is fluorenyl, substituted or unsubstituted. Bilateral symmetry is defined as the condition in which there are no substituents or one or more substituents on one side and no substituents or one or more of the same substituents on the other side in the same relative position such that a mirror image is formed from one side to another. One example of such a compound is isopropylidene(cyclopentadienyl-1-fluorenyl)zirconium dichloride, abbreviated iPr(Cp)(Flu)ZrCl$_2$. Bilateral symmetry is illustrated by a plane bisecting the bridge resulting in the right side of each ligand being a mirror image of its left side. An illustration of the ligands of this compound are shown below:

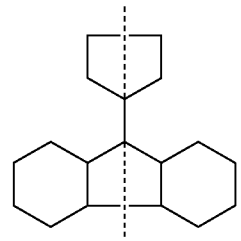

Pseudobilateral symmetry is defined as symmetry such that a mirror image exists from one side to the other in regard to the existence and position of substituents but the substituents themselves are not identical. Pseudobilateral symmetry is illustrated by a plane bisecting the ligand with the substituents being in the same relative position on each side of the plane, i.e., forming a mirror image as to location of substituents on the substituted cyclopentadienyl ring, but the substituents are not the same. This is illustrated below:

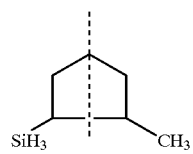

The metallocene compounds described above are supported to make a heterogeneous or solid catalyst. The support can be any solid which is chemically inert and unreactive with the metallocene and the other catalyst components. Examples of support material are porous materials such as talc; inorganic oxides, such as Group IIA, IIIA, IVA or IVB metal oxides, specifically, silica, alumina, magnesia, titania, zirconia, and mixtures thereof; and resinous materials, such as polyolefins, specifically, finely divided polyethylene, as disclosed in U.S. Pat. No. 4,701,432, hereby incorporated by reference. The support is preferably silica having high surface area in a range from 200 m$^2$/g to 800 m$^2$/g and small average pore volume in a range from 0.70 ml/g to 1.6 ml/g. One example of silica operative in this invention is chromatography grade silica. The preferred silicas are sold under the tradenames Ashi Olin H-121, Fuji Silicia P10, Q-6 and G-6.

The silica was treated with methylalumoxane (MAO) in the following manner: The silica had water removed to a level of approximately 0.5%. The dried silica was slurried in a nonpolar solvent. A solution of alumoxane in solvent was added to the silica slurry. After heating and subsequently cooling the slurry, the solid (silica treated with alumoxane) was separated out and (optionally) dried.

The metallocene was contacted with the MAO-treated silica to form a supported metallocene catalyst in the following manner: A solution of metallocene in a hydrocarbon solvent was added to a slurry of silica treated with alumoxane also in a hydrocarbon solvent, preferably the same solvent as the metallocene solution and maintained while stirring at a set temperature for thirty minutes to seventy-two hours. The solid, metallocene supported on silica treated with alumoxane, was separated out and dried. The MAO/silica weight ratio is between 0.5:1 to 3:1 while the per cent metallocene is between 1.0%–4.0%.

A suspension was formed with the supported metallocene catalyst in an inert liquid carrier, such as mineral oil. The liquid carrier is selected based on the following properties:

1. The liquid does not dissolve the solid catalyst component.
2. The liquid has minimal chemical interaction with the catalyst component.
3. The liquid is preferably an inert hydrocarbon.
4. The liquid only "wets" the catalyst component
5. The liquid has sufficient viscosity to maintain the catalyst component in suspension without excessive agitation. Liquids which would be effective in this invention would be long chain hydrocarbons, such as mineral oil and polyisobutylene. This listing is not intended to be complete and all inclusive but is merely made to show examples of useful liquid media.

A co-catalyst is utilized to aid in the activation of the catalyst for the polymerization reaction. The most commonly used co-catalyst is an organoaluminum compound which is usually an alkyl aluminum. The aluminum alkyl is of the general formula AlR'$_3$ where R' is an alkyl of from 1–8 carbon atoms or a halogen and R' may be the same or different with at least one R$^1$ being an alkyl. Examples of aluminum alkyls are trimethyl aluminum (TMA), triethyl aluminum (TEAl), triisobutyl aluminum (TiBAl) and diethyl aluminum chloride (DEAC). The preferred co-catalysts an aluminum trialkyl, specifically TEAl or TiBAl.

In order to increase the efficiency of a syndiospecific supported metallocene catalyst, the catalyst is pre-polymerized. Basically, the pre-polymerization reaction occurs as a monomer is introduced into a mixture of catalyst and co-catalyst. A small amount of the monomer is polymerized, and in so doing, it adheres to the surface of the catalyst and forms a coating. Any known method for pre-polymerizing a catalyst can be used for the catalyst of the present invention.

In pre-polymerizing the catalyst, a weight ratio of polymer/catalyst of approximately 0.01–3.0 is desirable. Preferably, the weight ratio of polymer to catalyst is less than 1.0, more preferably less than 0.5.

According to one embodiment of the invention, the supported metallocene catalyst is contacted with a co-catalyst and then is prepolymerized by contact with the monomer prior to being introduced into a polymerization reaction zone which contains additional monomer. In a preferred embodiment, the contact of the catalyst with the co-catalyst occurs in a holding tank in which the catalyst/co-catalyst mixture is allowed to age. The catalyst/co-catalyst mixture may be fed into the reactor in a continuous or periodic manner.

The contact of the catalyst/co-catalyst mixture with the monomer for prepolymerization can take place in a pipe which carries the catalyst into the polymerization zone. The contact time or residence time of the catalyst in the pipe need be only a few seconds. A minimum of three seconds of pre-contact between the catalyst/co-catalyst and the monomer is sufficient to significantly increase the efficiency of a syndiospecific catalyst. For an isospecific catalyst the minimum pre-contact time is 1–2 seconds. The concentration of co-catalyst in the stream may be varied as the co-catalyst is transferred into the polymerization reaction zone. A preferred concentration would be less than 10% co-catalyst in the stream by weight. All of the co-catalyst necessary for the polymerization reaction in the reaction zone need not be fed through this contact pipe. A portion of the desired amount of co-catalyst in the reactor may be added directly to the reaction zone.

The invention concerns an improvement in catalyst efficiency realized by control of the temperature during the process of contacting the metallocene compound with the MAO-treated silica. Decreased temperature of the process for supporting the metallocene on the MAO-treated silica results in higher the catalyst activity. Catalyst efficiency improved when the temperature was at below room temperature (25° C.). The preferred temperature range for supporting the metallocene compounds on the MAO-treated silica is from at or below room or ambient temperature (25° C.) down to −50° C. It is more preferred that the temperature be 0° C. or lower. It is most preferred that the temperature range be from 0° C. down to −20° C.

The invention having been generally described, the following examples are given as particular embodiments of the invention and to demonstrate the practice and advantages thereof. It is understood that the examples are given by way of illustration and are not intended to limit the specification or the claims to follow in any manner.

Preparation of the Metallocene

A manipulations were carried out under argon using standard Schlenk techniques unless otherwise noted.
SYNDIOSPECIFIC:
Preparation of the ligand [Ph$_2$C(Flu-Cy)]:

To a solution of 50 g fluorene in 200 ml anhydrous tetrahydrofuran at room temperature was added dropwise at 0° C., 207 ml of a 1.6 molar solution of n-butyllithium in hexane. The reaction mixture was stirred for 1 h at room temperature and cooled to −78° C. upon which light brown solid precipitated. 69.3 g of diphenylfulvene was then added to the reaction mixture. The heterogeneous mixture was allowed to gradually come to room temperature with constant stirring and was stirred at room temperature overnight (~18 h). The reaction mixture was cooled to 0° C. and cautiously quenched with dilute hydrochloric acid (10 to 18%) (slightly exothermic). The mixture was stirred at 0° C. for 5 minutes and diluted with 300 ml water and 200 ml hexane and filtered through a medium frit funnel. The resulting solid was washed with water (500 ml) followed by hexane (300 ml). The resulting wet solid was air dried followed by drying under vacuum with slight warming. To completely remove entrapped solvent the sample was heated at 100° C. under high vacuum overnight. The yield of THF-free and water-free ligand was in the range 70–80%.

Preparation of the metallocene [Ph$_2$C(Flu-Cp)ZrCl$_2$];

A three-necked 3 L flask equipped with mechanical stirrer and pressure equalized addition funnel was charged with 73.2 g of rigorously dried ligand obtained from the previous method (It should be noted that, the ligand must be dry but not necessarily free of THF. In case, THF-free ligand is used, it appears that it may be advantageous to use excess of n-butyllithium to complete dianion formation). One liter of anhydrous ether was added and the stirring initiated. The slurry was cooled to 0° C., and 254.2 ml of 1.6 molar n-butylithium in hexane was added dropwise cautiously. The temperature of the reaction mixture was gradually allowed to come to room temperature and stirred overnight (~18 h). The stirring was stopped and the solid was allowed to settle. The supernatant was decanted. The resulting solid was washed with two portions of anhydrous hexane (2×500 ml). A fresh batch of 1.0 L of anhydrous hexane was added and the stirring was initiated. The reaction mixture was cooled to 0° C. and 42 g of ZrCl$_4$ was added in small portions. The temperature was allowed to come to room temperature and stirred overnight (18 h). The stirring was stopped and the solid allowed to settle. The supernatant was decanted and the solid dried under vacuum. Total weight, 112 g (contains LiCl).

Chloroform Extraction Method 112 g of the crude product was added to a 3 L, 3 neck-flask and 2 L amylene-free chloroform (amylene present as a preservative in chloroform was removed either by purging with argon for 20 min or by removal under vacuum for a few minutes followed by release of vacuum with argon and repetition of the process 3–4 times) was added. The mixture was magnetically stirred at room temperature for 45 min; the stirring stopped and the flask was placed in a warm water bath. The solid suspension was allowed to settle. Using a cannula, the supernatant was filtered through a fritted funnel packed (⅔ full) with glasswool. After the filtration was complete the remaining solid was rinsed with additional CHCl$_3$ (or until the undissolved solid is pale colored) and the washings were filtered into the receiving flask. The solvent was removed from the filtrate and the resulting bright red solid, 101 g (>95% of theoretical recovery), was stored in the drybox.

ISOSPECIFIC:

Preparation of the ligand [Me$_2$Si(2-MeInd)$_2$]:

The synthetic procedure reported for 2-methylindene in J. Org. Chem. 47, 1058 (1982) was followed to obtain the compound as a colorless oil after distillation.

To a solution of 2-methylindene (2.58 g) in dry diethyl-ether (150 ml), a solution of methyllithium in ether (1.4M, 14 ml) was added slowly at room temperature and stirred overnight. The solvents were removed under reduced pressure and the resulting solid was slurried in dry hexane (150 ml). Dichlorodimethylsilane diluted in ether (30 ml) was transferred into the previous solution which was prechilled to −78° C. The reaction mixture was allowed to come to room temperature and stirring continued overnight. The reaction mixture was filtered and the solvents were removed from the filtrate under reduced pressure to obtain a white solid. The solid was washed with a small amount of hexane which was prechilled to −78° C. to obtain a whiter powder (0.75 g). From the hexane wash a second crop of the ligand was obtained (0.25 g). Total yield was 32%.

Preparation of the metallocene [Me$_2$Si[2-MeInd]$_2$ZrCl$_2$]

The ligand (1.0 g) obtained from the previous procedure was dissolved in anhydrous tetrahydrofuran (40 ml) and a solution of n-butyllithium in hexane (1.6M, 4.4 ml) was and stirred for 3 hours. The solvents were removed under vacuum to obtain a off-white solid which was washed with dry hexane under nitrogen atmosphere. The solid was cooled to −78° C. and methylene chloride prechilled to −78° C. was added followed by a slurry of zirconium tetrachloride in methylene chloride which was also prechilled to −78° C. The reaction mixture was allowed to gradually come to room temperature and stirred overnight. The solution was filtered and the solid was washed with hexane. The hexane washings were added to the filtrate at which time a off-white solid precipitated. Upon filtration the filtrate was concentrated and cooled to −78° C. for several hours to obtain a yellow solid. This yellow solid (0.30 g) was isolated by filtration and was found to be a mixture (65:35) or rac- and meso-isomers by NMR spectroscopy. $^1$HNMR (CD$_2$Cl$_2$) (in ppm), 7.67(2d), 7.45(d), 7.08(t), 6.99(t), 6.76(s), 6.74(s), 6.64(s), 2.44(s), 2.20(s), 1.42(s), 1.29(s), 1.22(s).

MAO Treatment of Silica

20 g of silica (P-10, average particle size 25 microns) was used as received. Toluene (200 mL) was added and the slurry stirred at room temperature. The MAO solution (3×500 mL) was then added to the silica slurry. The slurry was then heated to reflux for 4 hours. After cooling to room temperature, the supernatant was decanted by cannula and the solid washed four times each with 500 mL portions of toluene. The solid was then washed three times each with 100 Ml of hexane and then dried at 45° C. for 1 hour in vacuo. The MAO/silica weight ration in the isolated product was 0.9.

Supporting of Metallocene and MAO-Treated Silica

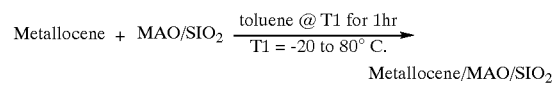

A toluene solution (25 mL) of metallocene (0.1 g) was added via cannula to a stirred slurry of MAO/SiO$_2$ (5 grams) in toluene (75 mL). Upon contact with the MAO/SiO$_2$, the red metallocene turns the solid deep purple. The slurry was stirred for one hour at the temperatures in the table below. The supernatant liquid was decanted and the solid washed three times each with 75 mL hexane. The purple solid was then dried overnight in vacuo at room temperature.

The following Examples illustrate the present invention in more detail and the advantages to be gained in increased catalyst efficiency by introducing a catalyst prepared with a low temperature supporting process into a polymerization reaction zone.

EXAMPLE I

The catalyst was prepared per the procedure above. The temperature at which the slurry of the syndiospecific metallocene and MAO-treated silica was stirred was 0° C.

A slurry of 50 mg solid catalyst component and 150 mg of triisobutylaluminum (TIBAl) was prepared in 1.5 ml mineral oil. all of the slurry suspension was added to a 4.0 liter autoclave from which the air had been sufficiently replaced by nitrogen. The autoclave was then charged with 2.9 liters of liquid propylene and 16 mmoles of gaseous hydrogen. The mixture was then heated to 60° C. and maintained for 60 minutes. The polymer was then dried at 80° C. Polymerization results are shown in Table 1.

Polymerization

| Reagents | | Conditions | |
|---|---|---|---|
| Catalyst: | 50 mg | Temperature: | 60° C. |
| TIBAl: | 150 mg 25% solution in hexane | Time: | 1 hour |
| Propylene: | 2.9 L (0.72 kg) | | |
| Hydrogen: | 16 mmol | | |

EXAMPLE II

The same procedure as Example I was used except the temperature at which the slurry of the metallocene and MAO-treated silica was stirred was 25° C. Polymerization results are shown in Table 1.

EXAMPLE III

The same procedure as Example I was used except the temperature at which the slurry of the metallocene and MAO-treated silica was stirred was 60° C. Polymerization results are shown in Table 1.

EXAMPLE IV

The same procedure as Example I was used except the temperature at which the slurry of the metallocene and MAO-treated silica was stirred was 80° C. Polymerization results are shown in Table 1.

EXAMPLE V

The same procedure as Example I was used except the metallocene compound was dimethylsilylbis(2-methylindenyl)zirconium dichloride and the temperature at which the slurry of the metallocene and MAO-treated silica was stirred was −20° C. and the alkylaluminum used was triethylaluminum. Polymerization results are shown in Table 1.

EXAMPLE VI

The same procedure as Example V was used except the temperature at which the slurry of the metallocene and MAO-treated silica was stirred was 0° C. Polymerization results are shown in Table 1.

EXAMPLE VII

The same procedure as Example VI was used except the silica used had an average particle size of 15 microns. Polymerization results are shown in Table 1.

EXAMPLE VIII

The same procedure as Example V was used except the temperature at which the slurry of the metallocene and MAO-treated silica was stirred was 25° C. Polymerization results are shown in Table 1.

EXAMPLE IX

The same procedure as Example V was used except the temperature at which the slurry of the metallocene and MAO-treated silica was stirred was 60° C. Polymerization results are shown in Table 1.

EXAMPLE X

The same procedure as Example IX was used except the silica used had an average particle size of 15 microns. Polymerization results are shown in Table 1.

EXAMPLE XI

The same procedure as Example V was used except the temperature at which the slurry of the metallocene and MAO-treated silica was stirred was 80° C. Polymerization results are shown in Table 1.

EXAMPLE XII

The same procedure as Example XI was used except the silica used had an average particle size of 15 microns. Polymerization results are shown in Table 1.

TABLE 1

| Example | Al Alkyl | Temp. (° C.) | Silica | Yield (g) | Efficiency |
|---|---|---|---|---|---|
| 1 | TiBAl | 0 | P-10 (25 μm) | 322 | 6440 |
| 2 | TiBAl | 25 | P-10 (25 μm) | 270 | 5400 |
| 3 | TiBAl | 60 | P-10 (25 μm) | 189 | 3780 |
| 4 | TiBAl | 80 | P-10 (25 μm) | 132 | 2640 |
| 5 | TEAl | −20 | G-6 (38 μm) | 905 | 12569 |
| 6 | TEAl | 0 | G-6 (38 μm) | 786 | 10917 |
| 7 | TEAl | 0 | P-10 (15 μm) | 780 | 10833 |
| 8 | TEAl | 25 | G-6 (38 μm) | 486 | 9720 |
| 9 | TEAl | 60 | G-6 (38 μm) | 673 | 9347 |
| 10 | TEAl | 60 | P-10 (15 μm) | 700 | 9122 |
| 11 | TEAl | 80 | G-6 (38 μm) | 694 | 9639 |
| 12 | TEAl | 80 | P-10 (15 μm) | 512 | 7111 |

Catalyst efficiency is related to temperature of the process of supporting the metallocene on the MAO treated silica. Catalyst efficiency improved when the temperature was lower. Catalyst efficiency was highest when the temperature was at 0° C. or below down to −20° C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A process for polymerizing an olefin monomer comprising:
   a) forming a metallocene catalyst by the steps comprising:
      1) forming a solution of a metallocene of the general formula

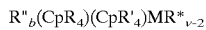

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M, in a nonpolar solvent;
2) forming a slurry of silica treated with alumoxane in a nonpolar solvent;
3) contacting the solution and the slurry together at a temperature of −20° C. to 0° C.;
4) stirring the resulting slurry while maintaining the temperature;
5) separating the solid catalyst; and
6) drying the solid catalyst;
b) activating the solid catalyst with an aluminum alkyl of the formula AlR'$_3$ where R' is alkyl of from 1–8 carbon atoms or a halogen, R' being the same or different with at least one R' being an alkyl;
c) introducing the catalyst into a polymerization reaction zone containing an olefin monomer and maintaining the reaction zone under polymerization conditions; and
d) extracting a polymer.

2. The process as recited in claim 1 wherein the metallocene is a stereospecific catalyst precursor.

3. The process as recited in claim 2 wherein the metallocene is an isospecific catalyst precursor.

4. The process as recited in claim 2 wherein the metallocene is an syndiospecific catalyst precursor.

5. The process as recited in claim 1 wherein each (CpR$_4$) and (CpR'$_4$) are different and a bilateral symmetry exists for (CpR$_4$).

6. The process as recited in claim 5 wherein (CpR'$_4$) is a substituted or unsubstituted fluorenyl ring.

7. The process as recited in claim 5 wherein (CpR$_4$) is an unsubstituted cyclopentadienyl ring.

8. The process as recited in claim 1 wherein the metallocene is isopropylidene(cyclopentadienyl-1-fluorenyl) zirconium dichloride.

9. The process as recited in claim 1 wherein each (CpR$_4$) and (CpR'$_4$) are the same.

10. The process as recited in claim 9 wherein (CpR$_4$) and (CpR'$_4$) are indenyl or substituted indenyl rings.

11. The process as recited in claim 10 wherein (CpR$_4$) and (CpR'$_4$) are (2-methylindenyl) or (2-methyl-4-phenyl indenyl).

12. The process as recited in claim 1 wherein the metallocene is dimethylsilylbis(2-methylindenyl) zirconium dichloride or dimethylsilylbis(2-methyl-4-phenyl indenyl) zirconium dichloride.

13. The process as recited in claim 1 wherein the metallocene is isopropylidene(t-butylcyclopentadienyl-1-fluorenyl)zirconium dichloride.

14. The process as recited in claim 1 wherein the solid is chromatography grade silica.

15. The process as recited in claim 14 wherein the silica has high surface area in a range from 200 m$^2$/g to 800 m$^2$/g and small average pore volume in a range from 0.70 ml/g to 1.6 ml/g.

16. The process as recited in claim 14 wherein the silica has an average particle size in a range from 15 to 38 microns.

17. The process as recited in claim 16 wherein the silica has an average particle size of 25 microns.

18. The process as recited in claim 16 wherein the silica has an average particle size of 38 microns.

19. The process as recited in claim 16 wherein the silica has an average particle size of 15 microns.

20. The process as recited in claim 1 wherein the process additionally comprises pre-polymerizing the catalyst prior to step c).

21. The process as recited in claim 20 wherein the catalyst is prepolymerized to a weight ratio of polymer/catalyst of approximately 0.01–3.0.

22. The process as recited in claim 21 wherein the catalyst is prepolymerized to a weight ratio of polymer/catalyst of less than 1.0.

23. The process as recited in claim 22 wherein the catalyst is prepolymerized to a weight ratio of polymer/catalyst of less than 0.5.

24. The process as recited in claim 20 wherein the catalyst is prepolymerized for a minimum of three seconds.

25. The process as recited in claim 20 wherein the catalyst is prepolymerized for 1–2 seconds.

26. The process as recited in claim 1 wherein the aluminum alkyl is a trialkyl aluminum.

27. The process as recited in claim 1 wherein the trialkyl aluminum is tri-isobutyl aluminum, triethyl aluminum or diethyl aluminum chloride.

28. The process as recited in claim 27 wherein the trialkyl aluminum is tri-isobutyl aluminum or triethyl aluminum.

* * * * *